United States Patent
Boehm et al.

(10) Patent No.: US 7,320,498 B2
(45) Date of Patent: Jan. 22, 2008

(54) ROOF MODULE FOR A MOTOR VEHICLE

(75) Inventors: Horst Boehm, Frankfurt am Main (DE); Rainer Grimm, Frankfurt am Main (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 11/293,767

(22) Filed: Dec. 2, 2005

(65) Prior Publication Data

US 2006/0119142 A1  Jun. 8, 2006

(30) Foreign Application Priority Data

Dec. 8, 2004  (EP) .................. 04029113

(51) Int. Cl.
*B60J 7/00*  (2006.01)
(52) U.S. Cl. ................................. 296/216.06
(58) Field of Classification Search ............... 296/213, 296/216.06–216.09
See application file for complete search history.

(56) References Cited

U.S. PATENT DOCUMENTS

| 4,630,333 | A | * | 12/1986 | Vickers ..................... 16/338 |
| 5,540,478 | A | * | 7/1996 | Schuch ..................... 296/210 |
| 6,345,859 | B1 | * | 2/2002 | Thomas ................. 296/216.08 |
| 6,409,258 | B1 | * | 6/2002 | Grimm et al. ......... 296/216.08 |
| 7,124,471 | B2 | * | 10/2006 | Koessler ..................... 16/267 |

FOREIGN PATENT DOCUMENTS

| DE | 102 10 615 A1 | 10/2003 |
| EP | 1 088 704 A1 | 4/2001 |
| EP | 1 155 942 A1 | 11/2001 |

OTHER PUBLICATIONS

European Search Report, Jun. 20, 2005.

* cited by examiner

*Primary Examiner*—Dennis H. Pedder
(74) *Attorney, Agent, or Firm*—Carlson, Gaskey & Olds

(57) ABSTRACT

The invention relates to a roof module for a motor vehicle that includes an external roof skin and a roof ledge. The roof module and the roof ledge are a preassembled unit with the roof ledge being configured as a separate part.

1 Claim, 2 Drawing Sheets

ROOF MODULE FOR A MOTOR VEHICLE

BACKGROUND OF THE INVENTION

The application claims priority to European Application No. 04 029 113.0, which was filed on Dec. 8, 2004.

The invention relates to a roof module for a motor vehicle.

In a conventional construction of a roof, a roofing plate made of metal is welded to side rails. The weld seam must be selected such that the weld seam is sufficiently large in order to set welding tools therein. This results in a gap. The gap is used for fastening a roof rack and is covered by a roof ledge.

In contrast to this, foamed roof modules are glued to the side rails of a vehicle body, with the foamed roof module resting on flanges of the side rails and a narrow gap arising between the foamed roof module and the respective side rail. To fasten load carrying implements to such vehicle roofs, load carrying implement fastening devices are provided in the gap between the roof module and the side rail. These load carrying implement fastening devices may be covered by roof ledges.

It is the object of the invention to provide a more cost-efficient roof module for a motor vehicle.

SUMMARY OF THE INVENTION

The subject invention provides a roof module for a motor vehicle that includes an external roof skin and a roof ledge. The roof module and the roof ledge are a preassembled unit with the roof ledge being configured as a separate part. Preferably, the roof module is a component having a plastic outer skin, and is produced by a foaming process. The roof ledge is configured as a separate part but is fastened to the roof module to form a preassembled unit. This preassembled unit can be supplied to a car manufacturer which only has to fasten the unit to the side rails of the vehicle roof, and thus is no longer required to affix the roof ledge afterwards, as was customary in the past. Integrating the roof ledge in the roof module results in a simpler and more cost-efficient mounting of the roof module to the vehicle.

Preferably, the roof ledge is divided in portions comprising at least two portions that selectively cover an access to a load carrying implement fastening device. Load carrying implements are known in a variety of versions and carry, for instance, bicycles, skis, boats or hard-shell boxes. In these arrangements, a simple, reliable and detachable fastening of the load carrying implement on the vehicle is desirable, which is made possible by portions underneath which a load carrying implement fastening device of the type as shown in EP 1 088 704 A2, for example, may be installed.

The roof module preferably has a reinforcement piece to which the roof ledge is fastened. As the reinforcement piece is part of the roof module, the roof ledge is also integrated in the roof module.

It is preferred that the roof module has a plate-shaped roof part defining the external roof skin, with the reinforcement piece being connected with the plate-shaped roof part. The plate-shaped roof part is formed here by a foaming process, and the reinforcement piece may be embedded in the foam of the plate-shaped roof part. It is possible thereby to produce a connection in one single method step.

The reinforcement piece can be a part of a guide frame of a cover of an openable roof. The openable roof is in particular a spoiler roof in which the cover is shifted to lie above the roof skin.

Preferably, at least sections of the roof ledge, along a length of the roof ledge, are clipped on the reinforcement piece. In the preferred embodiment, the roof ledge is clipped along an entire length of the roof ledge. This ensures a more cost-effective production of the roof ledge, because the roof ledge is configured as an unchanging profiled part along the entire length. Further, no visual impairments of a roof surface will appear.

At least sections of the roof ledge, along the length of the roof ledge, can be tilted. In the preferred embodiment however, the roof ledge can be tilted along the whole length of the roof ledge. This permits a particularly cost-efficient design of the roof ledge, because the roof ledge has the same configuration in all areas. Further, a visual impairment of the uniform roof surface will be prevented and easy mounting is made possible.

According to one embodiment, the reinforcement piece is configured in two parts and has an intermediate profile, with the roof ledge being clipped on the intermediate profile.

The intermediate profile preferably is an extruded profile. Extruded profiles can be produced at favorable costs.

The reinforcement piece may project laterally beyond an edge of an external roof skin.

According to one embodiment, there is provided a connecting portion to which the roof ledge is fastened, the connecting portion being configured to be noncircular. The roof ledge has a corresponding counterpart, which is designed to be sufficiently elastic such that the roof ledge remains in position when tilted to stand upright. During attachment of the roof load carrying implements, portions of the roof ledge may be tilted to stand upright without the need of any additional components to retain the tilted roof ledge. This is more cost-efficient.

Preferably, the connecting portion has a polygonal profile. One embodiment shows a square profile providing two positions of the roof ledge in which the latter can be retained.

It is preferred that the roof ledge is an extruded profile. Extruded profiles offer a favorable production.

These and other features of the present invention can be best understood from the following specification and drawings, the following of which is a brief description.

DETAILED DESCRIPTION OF THE PREFERRED EMBODIMENT

Figure 1:
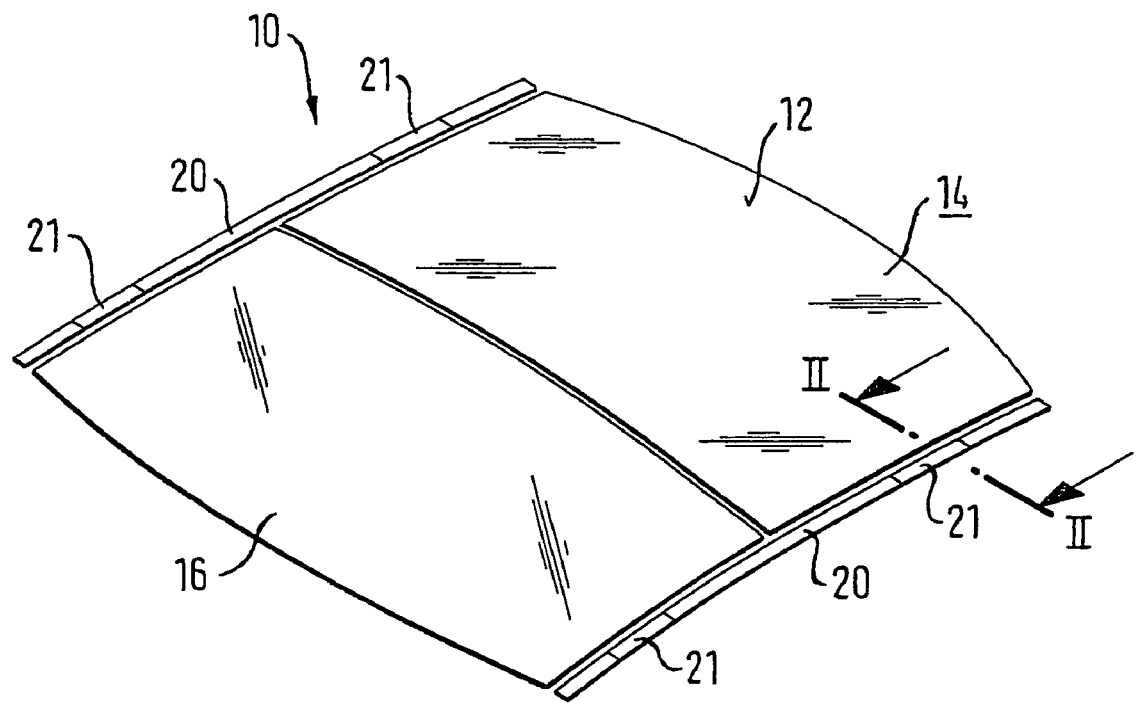
FIG. 1 shows a perspective view of a vehicular roof module according to the invention.

FIG. 1 shows a roof module 10 for a vehicle. The roof module 10 has a plate-shaped roof part 14, which is produced by a foaming process and forms an external roof skin 12. The plate-shaped roof part 14 could also be formed as a glass part, however. Foamed vehicular components are known, in particular those which comprise a polyurethane (PU) material that is reinforced with glass fibers, and which are produced by providing a plastic foil with a foamed or injection-molded backing. This plastic foil is dyed throughout and serves as an outer skin of the vehicular component. As these components are known, they will not be explained in further detail.

The roof module 10 is part of an openable roof and has a stationary roof part 14 and a cover 16 that can be selectively shifted to open or close a roof opening (not shown).

The roof module 10 is a spoiler roof in which the cover 16 is moved along lateral guide rails (not shown) integrated in the stationary roof part 14 to lie above the external roof skin 12 of the stationary roof part 14.

Roof ledges 20 are arranged on each edge of the roof module 10. If only one roof ledge 20 is referred to in the following description, it should be understood that both roof ledges 20 have the same configuration.

The roof ledge 20 is divided into various parts that are produced in the form of an extruded profile as a separate component. The roof ledge 20 is attached to the roof module 10 to form a preassembled unit that will be mounted as a unit on the vehicle.

Figure 2:
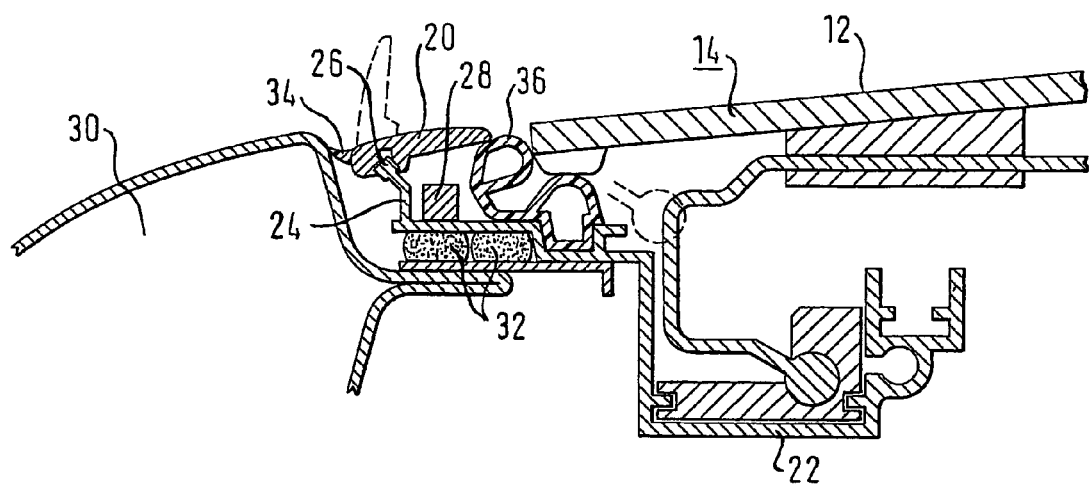
FIG. 2 is a sectional view of an installed roof module of the invention according to a first embodiment along line II-II in FIG. 1.
Figure 3:
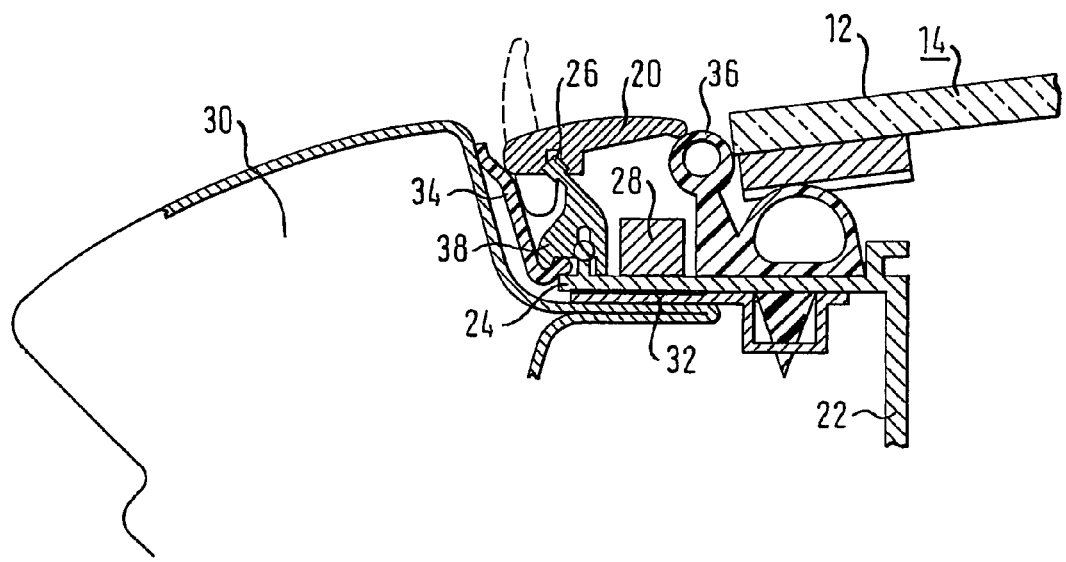
FIG. 3 is a sectional view of the installed roof module of the invention according to a second embodiment along line II-II in FIG. 1.

Each roof ledge 20 has two portions 21 configured such that the two portions 21 may cover and expose an access to a load carrying implement fastening device 28 (schematically shown in FIGS. 2 and 3). A load carrying implement fastening device of the type as used here is shown in EP 1 088 704, which is incorporated herein by reference.

The roof module 10, configured as a spoiler roof, has a guide frame 22 that is known. A reinforcement piece 24 is part of the guide frame 22 and protrudes laterally beyond an edge of the external roof skin 12.

The fastening of the roof ledge 20 is shown in FIGS. 2 and 3. The roof ledge 20 is fastened to the reinforcement piece 24. The fastening comprises a clip-on connection. Along an entire length of the roof ledge 20, the roof ledge 20 is clipped on the reinforcement piece 24 and can be tilted along this entire length. As such, the reinforcement piece 24 along with a connecting portion 26 and the roof ledge 20, can be configured with an unchanging profile along the whole length and, thus, can be produced as cost-efficient extruded profiles that only are cut into sections with differing lengths.

For clipping on, the reinforcement piece 24 has the connecting portion 26, and the roof ledge 20 has a corresponding counterpart including a mount. A noncircular shaping of the connecting portion 26 of the reinforcement piece 24, and of the elastic counterpart of the roof ledge 20, make it possible that the roof ledge 20 can assume various positions and remain in an upright position (shown in broken lines). The counterpart has a slotted bearing in order to give the counterpart the required elasticity.

FIGS. 2 and 3 show the connecting portion 26 and the opening in the counterpart of the roof ledge 20 as a square cross-section. The square shape of the connecting portion 26 provides two positions between which the roof ledge 20 can be tilted, with the roof ledge 20 remaining in the upright position. FIG. 2 shows the roof ledge 20 in a retracted position, and shows the roof ledge 20 in an upright position in broken lines.

In the retracted position, the roof ledge 20 does not project beyond a geometrical envelope of the external roof skin 12, the latter being formed by the plate-shaped roof part 14. As such, it is possible to achieve a flat and visually appealing surface of the roof module 10.

The roof module 10 is connected with a side rail 30 of the roof in a known manner. FIG. 2 shows a bead of adhesive, serving as a connection 32 between the roof module 10 and the side rail 30. A weld seam or threaded joints may also be chosen as the connection 32.

A seal 34 covers a gap between the roof ledge 20 and the side rail 30, and another seal 36 covers a gap between the roof ledge 20 and the plate-shaped roof part 14.

FIG. 3 shows the roof module 10 in a second embodiment with the plate-shaped roof part 14 being made of glass. For a detailed explanation reference is made to the above description. Identical components are provided with the same reference numerals.

The roof ledge 20, which includes five parts for each side, is again clipped on the reinforcement piece 24 along the entire length, and is able to be tilted. The reinforcement piece 24 is part of the guide frame 22 of an openable roof (not shown) as described above.

In this embodiment however, the reinforcement piece 24 is configured in two parts and has an intermediate profile 38. The intermediate profile 38 is fastened to a lower frame portion of the reinforcement piece 24 by a latching connection.

In this embodiment, the intermediate profile 38 comprises the connecting portion 26. This connecting portion 26 corresponds to that of the first embodiment to which reference is made.

The seal 34, which is arranged between the side rail 30 of the roof and the roof module 10, is clamped in this embodiment between the reinforcement piece 24 and the intermediate profile 38.

Again, the gap between the roof ledge 20 and the plate-shaped roof part 14 is covered by the seal 36, with the roof ledge 20 resting on the latter.

The connection 32 that connects the side rail 30 of the roof with the roof module 10, and here in particular with the reinforcement piece 24, can be realized as a weld seam or bonded joint.

In the two embodiments according to FIGS. 2 and 3, the reinforcement piece 24 is part of the guide frame 22, and the roof ledge 20 is clipped on the reinforcement piece 24 or on the intermediate profile 38. In this way the roof ledge 20 is integrated in the roof module 10 and can be further processed and supplied as a preassembled unit.

The reinforcement piece 24 and, in the second embodiment, the intermediate profile 38 are also realized as extruded profiles and can thus be produced at favorable costs.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A roof module for a motor vehicle, comprising:
    an external roof skin;
    a roof ledge, the roof module together with the roof ledge comprising a preassembled unit with the roof ledge being configured as a separate part; and
    a connecting portion, the roof ledge being coupled to the connecting portion to form a clip connection interface, wherein the roof ledge is pivotable between an upright position and a retracted position via the clip connection interface, and wherein the connecting portion is configured to have a first noncircular profile with the roof ledge having a second noncircular profile that corresponds to the first noncircular profile wherein the first and second noncircular profiles interfit with each other to form the clip connection interface.

* * * * *